Patented June 16, 1931

1,810,794

UNITED STATES PATENT OFFICE

PHILIP McG. SHUEY AND ERWIN WOODWARD, OF SAVANNAH, GEORGIA

PROCESS FOR RECOVERY OF PHOSPHATE FINES

No Drawing.  Application filed September 23, 1929. Serial No. 394,730.

This invention relates to, and provides for, recovery of phosphate rock contained in sludge discharged as waste from plants in which crude phosphate-bearing material as mined has been washed, and in which plants the larger particles of phosphate rock are recovered.

In the mining of phosphate rock, after removal of the overburden, the crude material, consisting of phosphate-rock pebbles and/or boulders, sand, and clay, is conveyed in any suitable manner, and usually hydraulically, through a pipe to a washing-plant. In washing-plants as ordinarily used for the purpose, the crude material passes between log washers having metal flanges, which revolve in opposite directions, in the presence of water flowing therethrough. The rubbing of the rock and the large streams of water flowing on it in washing cause the main separation of the rock from the sand and clay. Screens are used in the washing-plant to obtain as large a recovery of phosphate rock as practicable, but they are comparatively coarse; and, inasmuch as it is a wet process, screening results only in partial recovery, and the sludge, which passes off, contains a large proportion of phosphate rock in the form of small wet particles or fines with fine gangue associated therewith.

It has been found that this sludge oftentimes contains as much as 50 per cent of low-grade and 30 per cent of high-grade phosphate, which heretofore has been a total loss. We have provided a process by which a large proportion of the sludge-contained phosphate is recovered.

In accordance with our process, the waste sludge, after it has been discharged from the washer, is dried, first by means of settling or drip vat or vats, or it may be allowed to flow on the ground in the open so that through drainage a large portion of the water is eliminated before the final drying process is employed; and the phosphate fines or small pebbles or boulders are separated from other ingredients of the sludge by screening, in any suitable manner.

As the sand and other gangue particles are smaller than the particles of phosphate rock, and as they can be dislodged, when dry, from adherence to much of the phosphate-rock particles, a screen is used that will permit the passage through it of the sand and other gangue and retain, and thus separate, the rock particles too large to pass through it.

Any of a number of suitable means may be used for drying and screening the sludge. For example, a rotary drier, of conventional form, heated by oil-burners or in any other suitable manner, has been found to answer the purpose satisfactorily, and from the drier the dried sludge is transferred to a rotary or shaker screen, which may or may not be connected directly to the drier. Moreover, the dried sludge may be subjected to an air separation process, whereby it may be dried and the phosphate fines separated out almost simultaneously.

We have found that our process will recover some 50 per cent of regular 68 per cent (tribasic phosphate of lime) grade of rock by use of a forty-mesh screen; in other words, that about one-half of the sludge heretofore wasted can be recovered as phosphate-rock particles. These small particles are easier to pulverize than the coarser particles separated out in the washing-plant, thereby saving some of the expense of grinding.

What we claim as new, and desire to secure by Letters Patent, is—

1. A process of treating wet or moist phosphate fines having attached finer gangue that includes the drying and dry size separating of the mixture.
2. A process that includes the drying of wet or moist phosphate fines having attached finer gangue, and subsequently dry size separating the dried mixture.
3. A process that includes the drying of sludge containing small particles of phosphate rock and finer gangue, and screening the dried mixture.
4. A process that includes the drying and dry size separating of sludge containing small particles of phosphate rock and finer gangue.

In testimony whereof, we affix our signatures.

PHILIP McG. SHUEY.
ERWIN WOODWARD.